(12) United States Patent
Paapsi

(10) Patent No.: US 8,597,381 B2
(45) Date of Patent: Dec. 3, 2013

(54) COMPACT FIRE LOG

(76) Inventor: Margus Paapsi, Tartumaa (EE)

( * ) Notice: Subject to any disclaimer, the term of this patent is extended or adjusted under 35 U.S.C. 154(b) by 2 days.

(21) Appl. No.: 13/247,317

(22) Filed: Sep. 28, 2011

(65) Prior Publication Data

US 2012/0304533 A1 Dec. 6, 2012

(30) Foreign Application Priority Data

Jun. 6, 2011 (EE) .............................. 201100050 U

(51) Int. Cl.
*C10L 11/06* (2006.01)

(52) U.S. Cl.
USPC .................... 44/522; 44/520; 44/533; 44/535; 44/606

(58) Field of Classification Search
USPC ........... 44/520, 521, 522, 530, 532, 533, 535, 44/605, 606, 628; 144/363, 137.7, 371; 142/22
See application file for complete search history.

(56) References Cited

U.S. PATENT DOCUMENTS

| | | | | |
|---|---|---|---|---|
| 3,532,477 | A * | 10/1970 | De Capitani | 44/512 |
| 4,189,305 | A * | 2/1980 | Clayton | 110/341 |
| 4,485,584 | A * | 12/1984 | Raulerson et al. | 44/531 |
| 5,743,248 | A * | 4/1998 | Jansen, Jr. | 126/25 B |
| 2003/0070349 | A1* | 4/2003 | Thompson | 44/519 |
| 2009/0307968 | A1* | 12/2009 | Parker | 44/535 |

FOREIGN PATENT DOCUMENTS

| | | | |
|---|---|---|---|
| CH | 697091 A5 | * | 4/2008 |
| GB | 17327 | | 0/1898 |
| JP | 2002338978 A | * | 11/2002 |

OTHER PUBLICATIONS

Screenshots from "How to make a swedish torch," video uploaded by Doogly13 on Jan. 10, 2011, viewed at http://www.youtube.com/watch?v=vjQRLQTNsJo&feature=related on Apr. 19, 2012, 5 pages.
Photos of "Lappish Candle," source and date unknown, 4 pages.
Screenshots from "How to make a fire log," video uploaded by MarcelsWorkshop on Jul. 9, 2011, http://www.youtube.com/watch?v=emm_DBKTi3k&feature=fvwrel on Apr. 19, 2012, 9 pages.
Screenshots from "The fire log," video uploaded by The Wild North on Jul. 9, 2010, http://www.youtube.com/watch?v=jajQ9gl7Kw4 on Apr. 19, 2012, 6 pages.

* cited by examiner

*Primary Examiner* — Pamela H Weiss
(74) *Attorney, Agent, or Firm* — James L. Young; Westman, Champlin & Koehler, P.A.

(57) ABSTRACT

A fire log has one or several longitudinal incisions, which penetrate the log but do not reach the side surface and intersect in the log's midsection. A lower part of the log has at least one air duct from the side surface to the log's midsection in case the log is set on a surface which obstructs airflow to the log's lower part. The log's midsection contains an ignition device, which can be an ignition strip, tablet, briquette or other that has been permeated with an ecologically friendly flammable substance that burns fast and evenly.

10 Claims, 1 Drawing Sheet

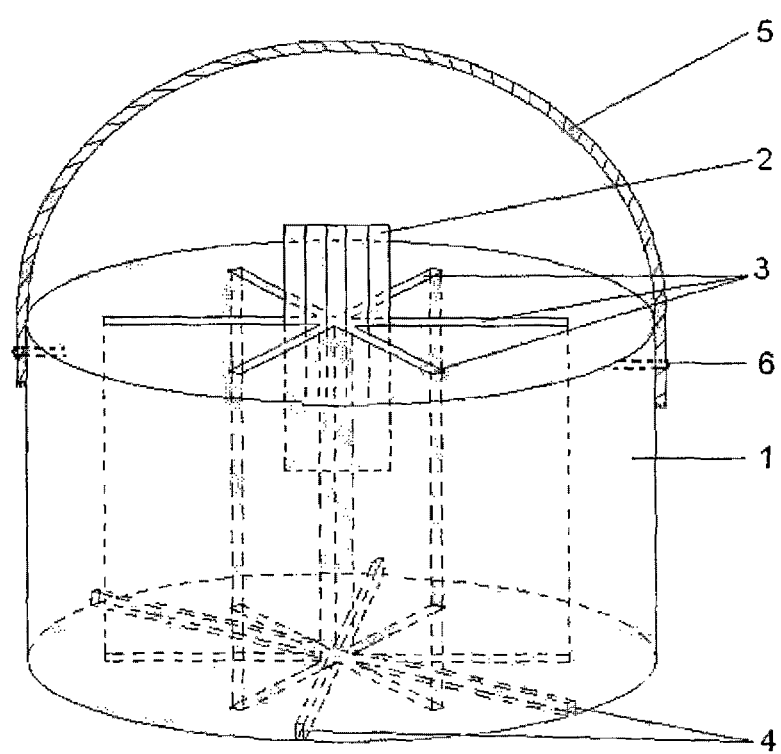

COMPACT FIRE LOG

The invention is a device meant for log-fires; it can be used in a fireplace or at a campsite and can later be used to make grill coal.

BACKGROUND

There are disclosed several compact means for starting a log-fire, including wood logs.

The United Kingdom patent GB 17327 describes a wood log that contains a flammable substance and is used as a container for this flammable substance. Holes drilled into the log are filled with a flammable substance (e.g. coal dust) and sealed with caps. The aim is a longer burning time of the wood log and at the same time making use of the coal dust or other finely fractioned flammable substance.

Coal dust can not be openly used in a fireplace, but can be used when sealed in a wood log. Wood logs known as Lapland candles also contain incisions which enable burning it as a single log. In case of the Lapland candle, the incisions extend over the sides of the log which cause the flames to immediately spread to the log's side surfaces; the log burns as a torch and will fall into pieces before burning out.

Thus, no comfortable fire log is disclosed that would enable comfortable handling and that would burn evenly as a whole; that would not burn as a torch and fall into pieces before burning out; and that could be used both in a campfire and a fireplace; and where everything necessary would be in one package that requires no additional preparations before use.

DISCLOSURE SUMMARY

The task of the invention is to create a compact fire log that burns evenly and as a whole for a long time.

The invention comprises an unbroken wood log sawn from the trunk of a tree, which has one or several incisions that longitudinally pass the log but do not reach the log's surface and contain an ignition device. Several longitudinal incisions in the log which intersect in the log's midsection are preferable. The lower part of the log contain at least one air duct from the side surface towards the log's midsection to guarantee the supply of air. The ignition device may be an ignition strip, tablet, briquette or other, permeated with a flammable substance, which burns fast and evenly and is ecologically friendly. The ignition device may contain a wick, fuse or other. The ignition device is preferably impregnated with natural flammable substances such as stearine, paraffin or other.

The disclosed device will initially burn as a fire and later the coal can be used for grilling.

The fire log contains a wood log 1, an ignition device 2, longitudinal penetrating incisions 3, air ducts 4, one or several handles 5 and handle fasteners 6.

A fire log of the present invention will burn from the inside out;
similarly to a candle, the flames will exit from the upper end preserving the log's decorative surface for the entire burning period. When the fire log has several longitudinal incisions, then the flaming and glowing images of branched sign will appear form the middle of fire log. Depending on the position and number of longitudinal incisions it is possible to generate desired images by burning of the fire log. A fire log of the present invention will burn significantly longer and give more warmth than a Lapland candle.

In the FIGURE: An overview of the device, where 1—log, 2—ignition device, 3—penetrating incisions, 4—air ducts, 5—handle, 6—handle fastener.

DESCRIPTION

A log is cut from a tree trunk in the desired length of 15-25 cm and a width of 25-35 cm for making the fire log. This is not split into pieces. Hardwood is preferred, especially birch, which burns for a long time, does not spark and has a decorative bark. Longitudinal incisions are made into the log's midsection which pass through the ends of the log and which are filled with the ignition device, which could be a sheet from cardboard strips permeated with a flammable substance or an ignition tablet or briquette containing a fuse. Paraffin, stearine, previously used cooking oil or other flammable substances can be used for impregnating the ignition device.

At least one air duct is made into the lower part of the log from the side surface to the midsection to ensure sufficient airflow in case the log is placed on a surface where airflow to the log's lower part is obstructed.

One or several handles are fastened to the log for instance using clamps.

Upon use the compact fire log is placed with the help of the handle(s) to the desired fire place (ground, fireplace or other surface) and the ignition device (fuse) is lit. After ignition, the ignition device catches fire and the flame moves inside the log down and outward from the midsection through the incisions. As the longitudinal incisions do not reach the fire log's side surfaces, most of the surface will remain intact for a long time during burning. Thanks to the placement of the longitudinal incisions and air ducts, the log burns evenly during a long period of time. For instance a fire log with the length of 20 cm and width of 30 cm will burn with a flame for 2.5-3 hours.

The ignition device can contain a wick, fuse or other. The fire log burns from the inside out and the flame exits the log from the upper end similarly to a candle, preserving the log's decorative outer surface for nearly the entire burning period. During burning, a flaming star shape is formed in the middle of the log. The fire log is comfortable to use, easy to take along and requires no additional procedures prior to use. In the open air, the log does not require any additional support for using a pot or a pan. The fire log burns significantly longer and gives more warmth than a Lapland candle.

The advantages of the invention are thus the following: firstly, fire log burns evenly and as a whole for a long time and does not break apart during burning. Secondly, it is convenient to use: it is easy to take along and does not require any additional actions to put it into working order. Thirdly, it uses natural renewable raw materials which are environmentally friendly and economic: they can be made using wood processing waste products and the ignition strip can be impregnated with natural flammable substances. Thus, it is not necessary to use ignition fluids or other inflammable or strongly smelling chemicals. In use in the open air, the fire log requires no additional support for using a pot or a pan to prepare or warm food.

The invention claimed is:
1. A compact log having a longitudinal extent from end-to-end, a core midsection, a lower part and a side surface, wherein the log comprises:
   a plurality of longitudinally extending, end-to-end incisions therethrough, wherein the incisions extend from a bottom surface of the log, intersect in the log's core midsection and fail to extend to the log's side surface; and an air duct in the bottom surface of the log that extends from the log's side surface to the core midsection of the log and fails to extend to the upper part of the log in order to avoid burning of the side surface of the log, wherein the air duct is configured as a groove, and wherein the air duct is radially offset from the incisions so that the air duct intersects the incisions only at the log's core midsection and only adjacent the bottom surface of the log.

2. The compact log of claim 1, and further comprising:
an ignition device disposed in at least one of the incisions.

3. The compact log of claim 2 wherein the ignition device is impregnated with a flammable substance.

4. The compact fire log of claim 3 wherein the flammable substance is a natural flammable substance.

5. The compact fire log of claim 2 wherein the incisions are filled with the ignition device.

6. The compact fire log of claim 2, and further comprising a plurality of said air ducts.

7. The compact fire log of claim 1 wherein the air duct extends along an end face of the log.

8. The compact fire log of claim 3 wherein the flammable substance is selected from the group consisting of stearine, paraffin and cooking oil.

9. The compact fire log of claim 1 further comprising a handle.

10. The compact fire log of claim 9 further comprising a fastener attached to the handle.

\* \* \* \* \*